United States Patent [19]

Pears et al.

[11] Patent Number: 5,364,891
[45] Date of Patent: Nov. 15, 1994

[54] INCORPORATION OF DESIRED GROUPS INTO POLYMERS, THE POLYMERS SO PRODUCED, AND COMPOSITIONS CONTAINING THEM

[75] Inventors: David A. Pears, Oss, Sweden; John G. Carey, Warrington, England; Paul H. Stenson, Burlington, Mass.; Gerardus C. Overbeek, Sprang-Capelle, Sweden

[73] Assignees: Imperial Chemical Indsutries PLC, London, United Kingdom; ICI Resins BV, Waalwijk, Sweden

[21] Appl. No.: 654,969

[22] Filed: Feb. 14, 1991

[30] Foreign Application Priority Data

Feb. 14, 1990 [GB] United Kingdom ............... 9003348
Jun. 15, 1990 [GB] United Kingdom ............... 9013480

[51] Int. Cl.$^5$ ............ C08F 2/50; C08F 265/06; C08F 216/36

[52] U.S. Cl. .................. 522/149; 522/86; 525/153; 525/245; 525/279; 525/263; 525/300
[58] Field of Search ............... 522/149, 86; 525/300, 525/263, 245, 279

[56] References Cited

U.S. PATENT DOCUMENTS

| | | | |
|---|---|---|---|
| 3,312,665 | 4/1967 | Caldwell | 525/54.1 |
| 5,002,998 | 3/1991 | Carey | 525/379 |
| 5,017,676 | 5/1991 | Cuscurida | 528/121 |
| 5,227,432 | 7/1993 | Jung | 525/286 |

Primary Examiner—Marion E. McCamish
Assistant Examiner—Arthur Koechert
Attorney, Agent, or Firm—Cushman, Darby & Cushman

[57] ABSTRACT

Process for making a polymer with desired groups Y comprising reacting a precursor polymer having carbon- or nitrogen-bound —$NH_2$ and/or —NH— groups with at least one compound having a single enolic carbonyl group and at least one group Y. Also the polymer itself and a composition containing it.

22 Claims, No Drawings

INCORPORATION OF DESIRED GROUPS INTO POLYMERS, THE POLYMERS SO PRODUCED, AND COMPOSITIONS CONTAINING THEM

The present invention relates to a process for the production of polymers having desired groups incorporated therein, to the polymers so produced, and to compositions containing these polymers.

It is known to be useful to modify the properties of polymers by incorporating desired groups of one sort or another into the polymer molecules. The desired groups may be incorporated either by employing as a monomer in the preparation of the polymer a compound which already has such groups, or by post-reacting a precursor polymer having precursor groups which may be converted by reaction(s) with a suitable reagent(s) to the desired groups.

We have now discovered a new and useful process of the latter type for incorporating desired groups into a polymer.

According to the present invention there is provided a process for the production of a polymer having desired groups, herein denoted by Y, incorporated therein which process comprises reacting a precursor polymer having carbon- or nitrogen-bound —NH$_2$ and/or —NH— precursor groups, which groups are reactable with enolic carbonyl groups, with at least one compound having a single enolic carbonyl group and at least one group Y, where by an enolic carbonyl group is meant herein a carbonyl group having enolic character by virtue of being bonded to an alpha methylene or methine group which in itself bonded alpha to an electron withdrawing group.

There is further provided according to the invention a polymer having desired groups, herein denoted by Y, incorporated therein, wherein said polymer has been prepared by a process comprising reacting a precursor polymer having carbon- or nitrogen-bound NH$_2$ and/or —NH— precursor groups, which groups are reactable with enolic carbonyl groups, with at least one compound having a single enolic carbonyl group and at least one group Y.

The groups Y may be disposed as chain-pendant (lateral) or terminal groups in the polymer according to the disposition of the precursor groups in the precursor polymer. Thus, if a precursor group —NH$_2$ is chain-pendant (lateral) in the precursor polymer, the group Y will also be chain-pendant in the final polymer. Alternatively, if a precursor group —NH$_2$ is terminal in the precursor polymer, the groups Y will also be terminal in the final polymer. (It is to be understood that for the purposes of this specification a group Y is still considered as a terminal group in the polymer if it has been incorporated via a terminal precursor group of the precursor polymer, i.e. irrespective of whether it is actually an end or capping group of the final polymer or whether is is separated from the end of the final polymer by intermediate chemical species).

As mentioned above, by an enolic carbonyl group is meant a carbonyl group (normally a ketonic carbonyl but possibly an aldehydic carbonyl) having enolic character by virtue of being bonded to an alpha (i.e. adjacent) methylene group (—CH$_2$—) or methine group

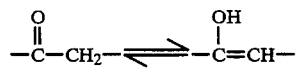

with there being an electron withdrawing group which is itself bonded alpha (i.e. adjacent) to the methylene or methine group, or in other words bonded beta to the carbonyl group. Such a carbonyl group also exists (to a significant degree) in its tautomeric enol structure. The enolising tautomerism may be represented as the following equilibrium.

$$-\underset{\underset{O}{\|}}{C}-CH_2- \rightleftharpoons -\underset{\underset{OH}{|}}{C}=CH-$$

The facile enolisability of the carbonyl group is due to the presence of the electron withdrawing grouping. Typical examples of electron withdrawing groups in enolic carbonyl groups include acid ester groups (the methylene or methine being bonded to the carbonyl carbon atom of the ester), acid amide groups (the methylene or methine groups being bonded to the carbonyl carbon atom of the acid amide), aryl groups (e.g. phenyl or phenylene groups), and ketonic carbonyl groups.

The electron withdrawing group as a whole may be univalent (i.e. capping the methylene or methine group) or, (as is also quite usual) may be divalent or multivalent (i.e. being bonded to a further moeity or moeities in the compound). In the case of the enolic carbonyl grouping having a methine group (rather than a methylene group) the remaining bond of this methine carbon atom (the others being attached to H, the carbonyl carbon atom, and the electron withdrawing group) should be attached to a group which does not affect the enolisability of the carbonyl group (e.g. alkyl or substituted alkyl, alkylene or substituted alkylene, alkanetriyl or substituted alkanetriyl, aryl or substituted aryl). Such a group can be monovalent (e.g. alkyl), divalent (e.g. alkylene) or multivalent (e.g. trivalent e.g. alkanetriyl).

(For the sake of clarity in nomenclature, we mean by an alkylene group, the divalent radical derived from the removal of any hydrogen atom from an alkyl radical and by an alkanetriyl group the trivalent radical derived from the removal of any hydrogen atom from an alkylene radical. The simplest alkylene radical is therefore methylene —CH$_2$— and the simplest alkanetriyl radical is therefore methine

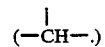

Examples of suitable enolic groupings (shown in their larger context) are:

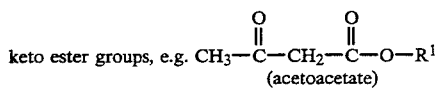
keto ester groups, e.g. CH$_3$—C(=O)—CH$_2$—C(=O)—O—R$^1$ (acetoacetate)

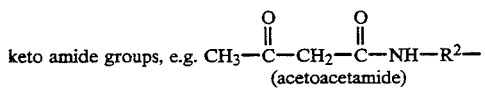
keto amide groups, e.g. CH$_3$—C(=O)—CH$_2$—C(=O)—NH—R$^2$— (acetoacetamide)

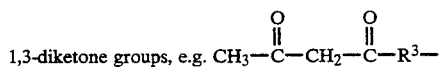
1,3-diketone groups, e.g. CH$_3$—C(=O)—CH$_2$—C(=O)—R$^3$— keto alkaryl groups, e.g. 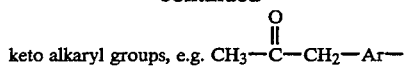

where $R^1$, $R^2$ and $R^3$ are hydrocarbyl radicals (optionally substituted) such as alkylene or alkanetriyl (usually of 1 to 10 carbons and typically methylene) and Ar is an arylene group (optionally substituted) such as ortho or para phenylene. Groups such as these are well known to be readily enolic.

The reaction of the precursor polymer having —$NH_2$ or —NH— groups with the enolic carbonyl compound is thought to proceed largely by the attack of these precursor groups on the enolic carbonyl groups so as to achieve bonding by means of the formation of an enamine structure by elimination of water; this may be represented schematically as follows

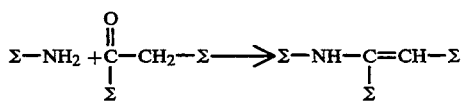

where Σ represents (in each position where it is denoted in the above formulae) the rest of the chemical species to which a particular group under consideration is attached. However, while we believe that this is the mechanism which operates, we would not wish to be held to this belief.

[The symbol Σ will hereinafter, as a matter of convenience, throughout this specification be used to denote the rest of the chemical species to which any particular grouping or atom under specific consideration is bonded].

Since the carbonyl compound has at least one desired group Y, the resulting final polymer will bear these desired groups Y. A group Y may be monovalent as a whole, so that it (in effect) caps the chemical species to which it is attached (Σ-Y) or it may be divalent (or multivalent) so that it is bonded at two or more sites to other chemical species (e.g. Σ-Y-Σ)

A discussed supra, a group Y may be lateral or terminal in the resulting final polymer according to whether the precursor group is lateral or terminal.

Various possibilities for the disposition of Y in the enolic carbonyl compound can be envisaged, as shown for example in the following possible schematic representations:

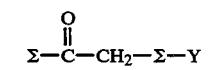

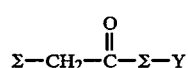

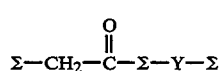

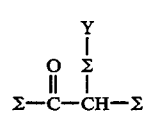

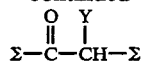

More than one of these possibilities can of course be present in a given enolic carbonyl compound.

Examples of groups Y include the following:
olefinically unsaturated carbon-carbon bonds, these could e.g. be incorporated as lateral or terminal groups by employing an enolic carbonyl compound having at least one (meth)acryloyl or (meth)allyl substituent group (or a substitued derivative thereof); examples of such compounds are

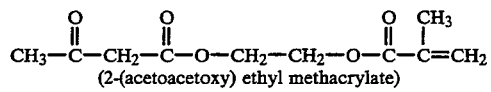
(2-(acetoacetoxy) ethyl methacrylate)

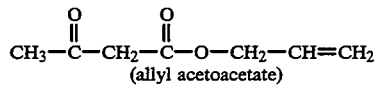
(allyl acetoacetate)

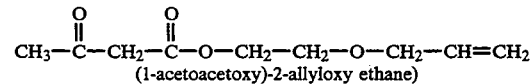
(1-acetoacetoxy)-2-allyloxy ethane)

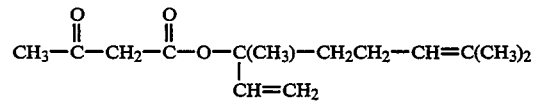

(Linalyl acetoacetate; derived from linalool); Geranyl acetoacetate (from geraniol); The acetoacetates of hydroxyethyl linolenic acid, hydroxyethyl linoleic acid, and hydroxyethyl abletic acid;

thiol groups such as —SH; an example of an enolic carbonyl compound providing lateral —SH groups is

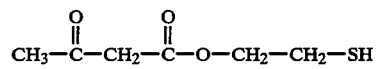

nonionic dispersing groups; these could e.g. be incorporated as lateral or terminal dispersing groups by using an enolic carbonyl compound having at least one water-soluble polymer chain, e.g. a polyethylene oxide chain (typically of 3 to 40 units), as or as part of a substituent on the compound; an example of such a compound is

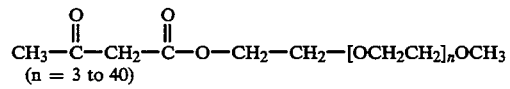
(n = 3 to 40)

a polymeric chain, such as a polyester chain, a polyamide chain or a polyimide chain; these could e.g. be incorporated as terminal or lateral groups by using an enolic carbonyl compound having the following formula

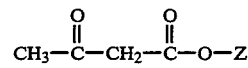

where the chemical species Z is or includes a polymeric chain group such as a polyester chain.

siloxane groups, for example of formula —Si(OR$^4$)$_k$ (R$^5$)$_i$ where i is 0, 1, or 2 and k is 1, 2 or 3 provided that k plus i equals 3, and R$^4$ and R$^5$, which may be the same as different, are hydrocarbyl groups such as alkyl groups (preferably lower alkyl of 1 to 5 carbons such as methyl and ethyl) or aryl groups (preferably phenyl): these could e.g. be incorporated as lateral or terminal groups by using a compound of general formula

where Q is alkylene such as —(CH$_2$)$_3$—, —(CH$_2$)$_4$—, or arylene such as —Ph— (Ph is para phenylene), and where R$^4$, R$^5$, k and i are as defined above. Such compounds could readily be prepared by the addition of diketene to commercially available aminopropyl, aminobutyl, or aminophenyl silanes such as

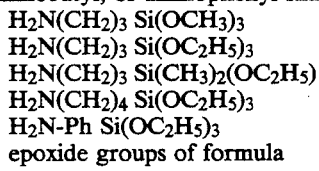

epoxide groups of formula

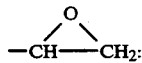

these could e.g. be incorporated as lateral or terminal groups by using a compound of formula

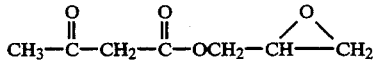

where such a material could be readily prepared by tertiary amine-catalysed addition of diketene to glycidol.

phosphonate or phosphate groups (for imparting corrosion resistance).

It is to be understood that Y could be any type of group which imparts desired or improved properties to the polymer or the products derived from it (e.g. coatings), e.g. an adhesion promoting group, a rheology modifying group, a stabilising group, a corrosion inhibiting group, a block copolymer-forming polymer chain group, or a crosslinking-assisting group (examples of which have been given supra).

The groups Y should not of course be of a type which will unacceptably interfere with the reaction of the —NH$_2$ or —NH— groups with the enolic carbonyl groups under the prevailing conditions of the process—thereby unacceptably interfering with the attachment of the Y groups to the polymer (e.g. by competing too successfully with the enolic carbonyls for reaction with the —NH$_2$ or —NH— groups).

The basic polymer structure of a polymer according to the present invention, which of course will be that of its precursor polymer, may be derived by the use of any suitable polymerisation technique. For example, the polymer structure may be that of an olefinic addition polymer, i.e. formed by the free-radical addition polymerisation of at least one (usually 2 or more) olefinically unsaturated monomer(s). The polymer structure may also be formed by a non-free radical addition polymerisation process or a condensation polymerisation process; examples of polymers formed in this way are polyurethane polymers [including poly(urethane-urea) polymers], polyester polymers, polyether polymers, polyimide polymers, and polyepoxide polymers. The techniques used for such polymerisation processes are well known and a detailed discussion thereof is not necessary here.

Where the polymer structure is derived from a free-radical addition polymerisation process, a wide variety of olefinically unsaturated monomers may be used to provide polymerised units of the polymer. Examples of such monomers include 1,3-butadiene, isoprene, styrene, divinyl benzene, acrylonitrile, methacrylonitrile, vinyl halides such as vinylidene chloride and vinyl chloride, vinyl esters such as vinyl acetate, vinyl propionate and vinyl laurate, heterocyclic vinyl compounds, alkyl esters of monolefinicaly unsaturated dicarboxylic acids (such as di-n-butyl maleate and di-n-butyl fumarate) and, in particular, esters of acrylic acid an methacrylic acid of formula

where R$^6$ is H or methyl and R$^7$ is alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, isopropyl acrylate, isopropyl methacrylate, n-propyl acrylate and n-propyl methacrylate. Again the techniques used for such addition polymerisation are well known and a detailed discussion thereof is not required here.

It is of course to be understood that whatever polymerisation technique is employed to provide the basic polymer structure, at least one of the monomers employed must yield units in the resulting polymer which either directly provide —NH$_2$ and/or —NH— groups as defined above, in which case the product of polymerisation is directly the precursor polymer, or provide groups which can subsequently be converted to such groups so as to then yield the precursor polymer.

For example, an —NH$_2$ terminated polyurethane polymer may be prepared by taking an isocyanate-terminated polyurethane polymer (e.g. an isocyanate-terminated prepolymer) and converting the terminal isocyanate groups thereof to groups providing carbon- or nitrogen-bound —NH$_2$ and/or —NH— groups which are capable of reaction with enolic carbonyl groups (instead of e.g. in the case of using an isocyanate-terminated prepolymer, chain-extending with an active hydrogen chain-extending material).

Such a conversion may be affected by using an appropriate amount of a reagent such as hydrazine hydrate or a polyamino compound (e.g. a diamine or triamine). Water itself may be used, the terminal NCO groups being converted to —NH$_2$ groups by hydrolysis. In the case of using hydrazine, the relevant reaction involved is the conversion of the terminal isocyanate groups of the polyurethane to terminal semicarbazide groups as follows:

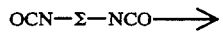

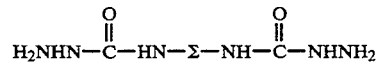

The resulting polymer (now a precursor polymer for producing a polymer according to the invention) could then be reacted with a compound having a single enolic carbonyl group and at least one group Y (thereby yielding a polymer according to the invention having terminal groups Y) according to the following possible schematic reaction:

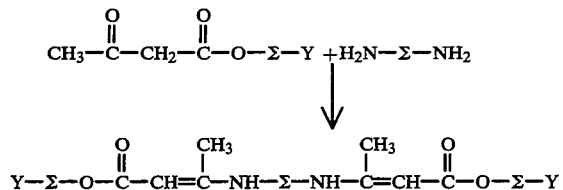

where Y is a desired group, such as an olefinic double bond.

The amount of reagent for introducing —NH$_2$ or —NH— groups into an isocyanate terminated polyurethane polymer may (if desired) be such as to effect a substantial proportion of chain extension (since it will of course be appreciated that such reagents are equally effective as chain-extension agents if used in sufficient quantity) as well as providing the desired level of termination required for subsequent functionalisation.

[As an alternative to the above, an —NH$_2$ terminated polyurethane polymer could also (perhaps more simply) be formed by first forming an NCO terminated prepolymer and then chain extending conventionally with a stoichoimetric excess of an active hydrogen chain extending material such as hydrazine or a polyamine so as to produce an —NH$_2$ terminated polyurethane after chain-extension; the terminal —NH$_2$ groups could then be reacted with a compound having a single enolic hycarbonyl group and at least one group Y thereby to form a polymer according to the invention having terminal groups Y].

Examples of suitable reagents, either for converting the terminal NCO groups of a polyurethane prepolymer to —NH$_2$ groups and/or for effecting chain extension of a polyurethane prepolymer so as to yield an —NH$_2$ terminated polymer after chain extension, include ethylene diamine, propylene diamine, butylene diamine, hexamethylene diamine, cyclohexylene diamine, piperazine, 2-methyl piperazine, phenylene diamine, tolylene diamine, xylene diamine, 4,4'-diaminodiphenylmethane, menthane diamine, m-xylene diamine, isophorone diamine, and adducts of diethylene triamine with acrylate or its hydrolyzed products. Also materials such as hydrazine, or hydrazine hydrate, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, hydrazides made by reacting lactones with hydrazine such as gamma-hydroxylbutyric hydrazide, bis-semicarbazide, and bis-hydrazide carbonic esters of glycols. Also, as mentioned above, water itself may be used.

As another example, an olefinic addition polymer (i.e. a polymer derived by the free-radical addition polymerisation of at least one olefinically unsaturated monomer) bearing chain-pendant (lateral) amino groups (precursor polymer) may be prepared by first preparing an olefinic addition polymer bearing chain-pendant (lateral) carboxyl groups (preprecursor polymer), and then converting at least a proportion of the lateral carboxyl groups of the preprecursor polymer to groups providing lateral amino groups (precursor polymer).

A preprecursor olefinic addition polymer bearing lateral carboxyl groups is conveniently prepared by polymerising at least one olefinically unsaturated monomer bearing at least one carboxyl group and optionally (but normally) at least one other olefinically unsaturated monomer (i.e. not bearing a carboxyl group).

Monomers which can be used to provide carboxyl groups in a preprecursor polymer are particularly $\alpha$, $\beta$-monoolefinically unsaturated monocarboxylic acids and/or dicarboxylic acids, mostly of 3 to 6 carbon atoms, especially acrylic acid, methacrylic acid, beta-carboxyethylacrylate, fumaric acid and itaconic acid.

Examples of olefinically unsaturated monomers not providing carboxyl functional groups (yielding polymerised units which are present in preprecursor, precursor, and final polymers) which may be mentioned include 1,3-butadiene, isoprene, styrene, divinyl benzene, acrylonitrile, methacrylonitrile, vinyl halides (such as vinyl chloride), vinyl esters (such as vinyl acetate, vinyl proportionate and vinyl laurate), heterocyclic vinyl compounds, alkyl esters of monolefinicaly unsaturated dicarboxylic acids (such as di-n-butyl maleate and di-n-butyl fumarate) and, in particular, esters, of acrylic acid and methacrylic acid of formula $CH_2=CR^6COOR^7$ where $R^6$ is H or methyl and $R^7$ is alkyl or cycloalkyl of 1 to 20 carbon atoms (more preferably 1 to 8 carbon atoms) examples of which are methyl acrylate, methyl methacrylate, ethyl acrylate, ethyl methacrylate, hydroxyethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate and n-propyl methacrylate.

The chain pendant carboxyl groups of a preprecursor olefinic addition polymer may, for example, conveniently be converted to the lateral amino groups of a precursor polymer by means of an immination reaction involving the carboxyl (or derived carboxylate salt) group and an added aziridine compound. The aziridine compound is commonly referred to an alkylene imine and preferably has the formula

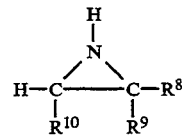

where $R^8$ and $R^9$ which may be the same or different are selected from hydrogen, benzyl, aryl, and C1 to C5 alkyl; and where $R^{10}$ is hydrogen or C1 to C5 alkyl. More preferably $R^8$ is hydrogen, $R^9$ is hydrogen or C1 to C5 alkyl (particularly methyl) and $R^{10}$ is hydrogen. Ethylene imine ($R^8=R^9=R^{10}=H$) and propylene imine ($R^8=R^{10}=H; R^9=$methyl) are particularly preferred aziridines because of their relatively low cost and ready availability. The corresponding chain pendant amino ester groups (providing the chain pendant amino groups) formed by the immination reaction can be represented in the following schematic formulae:

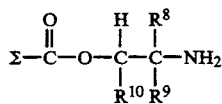

or

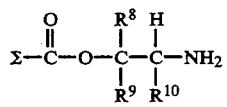

and possibly

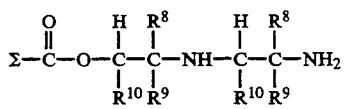

(the latter being formed by further reaction of some of the pendant primary amine groups with the aziridine) where $R^8$, $R^9$ and $R^{10}$ are as defined above.

The amount of alkylene imine used should be sufficient to imminate the desired proportion of the carboxyl groups to aminoalkyl ester groups. Preferably the amount used should be sufficient to imminate about 5% to 95%, preferably 20% to 80% (more preferably 34–70%), of the carboxyl groups on the preprecursor polymer. The immination technique is in itself well-known and may be performed by techniques known to the art.

Useful precursor olefinic polymers for the present invention are imminated acrylic polymers (i.e. having at least a proportion, usually a high level, of acrylic or methacrylic ester units as defined above as well as imminised units providing lateral amino groups). Such polymers could, for example, be reacted with enolic compounds having a desired group Y (e.g. 2-(acetoacetoxy)ethyl methacrylate) to yield the desired functionalised polymer having the groups Y incorporated therein.

The chain-pendant amine functionality could of course be introduced into the olefinic addition precursor polymer by techniques other than immination (e.g. by using as a monomer an olefinically unsaturated oxazoline monomer, such as 2-isopropenyl oxazoline followed by hydrolysis of the oxazoline groups to aminoalkyl ester groups).

It will be appreciated that numerous variations on the types of themes outlined above could be adopted. For example a non-free radical addition-type precursor polymer, such as a polyurethane, bearing lateral amino groups could be employed (i.e. instead of an olefinic polymer). Such a polyurethane polymer could e.g. be made by employing as a reactant in the polyurethane prepolymer formation an isocyanate-reactive compound having at least one carboxyl group and at least two isocyanate-reactive groups, such as 2,2-dimethylolpropionic acid, thereby to provide lateral carboxyl groups in the prepolymer, and converting the lateral carboxyl groups to groups providing lateral amino groups (e.g. by immination as described supra for olefinic polymers) whether before or after chain-extension (whichever is more appropriate or convenient).

When undertaking a reaction to convert a preprecursor polymer to a precursor polymer having the required —$NH_2$ and/or —NH— groups, it may be feasible in some cases to effect this reaction in the presence of the enolic carbonyl compound, so that the latter reacts in-situ with the —$NH_2$ or —NH— groups as they are formed. More usually, however, the precursor polymer is formed separately and then admixed with the enolic compound.

The polymerisation to form the basic polymer structure may be carried out in an aqueous medium or in an organic liquid medium (sometimes in bulk) as appropriate or desired, giving rise to aqueous- or organic liquid-based dispersions (e.g. latices, suspensions or solutions). The conversions of preprecursor polymer (where used) to precursor polymer, and precursor polymer to final polymer may likewise be carried out in an aqueous or organic liquid medium as desired or appropriate, and the medium employed for the polymerisation process to form the basic polymer structure may be basically the same as that used for the conversion(s). However, the medium employed for the polymerisation could if desired or if appropriate be changed for the conversion(s). For example, the organic liquid medium used for making a polyurethane polymer may be changed if desired to an aqueous-based medium for the purpose of forming —$NH_2$ groups on the polyurethane polymer and subsequent conversion to a final polymer containing the desired groups Y.

It is therefore the case that the (final) polymer of the invention may be formed as, or subsequently be converted to, an aqueous-based or organic liquid-based dispersion, and particularly the former since many preferred applications of the polymers of the invention involve their use as aqueous dispersions. (For the purposes of this specification an "aqueous dispersion" of a polymer means a dispersion of the polymer in an aqueous medium of which water is the principal component. Minor amounts of organic liquid may optionally be present).

To assist the formation of aqueous dispersions in the case of certain polymers which do not readily disperse into water (e.g. polyurethane polymers), the polymers of the invention may have appropriate ionic and/or non-ionic lateral dispersing groups; these can be incorporated at any suitable stage of the synthesis.

As discussed supra, the polymers of the present invention are usefully employed as organic (or more preferably) as aqueous dispersions. Such dispersions may be used "as is" (apart from optional dilution with water and/or organic liquid or concentration by evaporation of water and/or organic liquid) in various applications or (more usually) may be used as a component of organic-based or (more usually) aqueous-based compositions incorporating other additional components, for example coreactant materials (appropriate to the Y groups) which will take part in (or assist with) a reaction involving the Y groups under certain conditions—as for example when the composition is a coating composition and the coreactant takes part in (or assists) a reaction involving the Y groups such as crosslinking during and/or after film formation from the composition (when the dispersing medium is being or has been removed).

It is feasible in some cases for a coreactant material, which is intended for inclusion in an eventual composition, to be present in the system when the —$NH_2$ and/or —NH— groups of the precursor polymer are reacted with the enolic carbonyl compound. Alternatively, or where this is not possible, the coreactant material may be admixed subsequent to the reaction with the enolic compound.

The nature and properties of the desired groups Y in a polymer of the invention will be commensurate with the intended application for the polymer (or composition containing it). For example, where Y is an olefinic double bond, the polymer may be used for crosslinking purposes e.g. as a component of a coating composition (preferably aqueous-based) which is cross-linkable during and/or after film formation. For example, if the olefinic double bond is that of a (meth)acrylate group, the polymer can be crosslinked by exposure to ultraviolet radiation in the presence of a suitable photoinitiator, or by exposure to electron beam radiation, or by thermal curing using e.g. a peroxy curing agent. If, for example, the olefinic double bond is that of a (meth)allyl group, the polymer can be crosslinked by air oxidation in the presence of suitable metal drier salts (autoxidation).

Where Y is a pendant —SH group, the polymer may likewise be employed for crosslinking purposes, e.g. as a component of a coating composition (preferably aqueous-based) which is crosslinkable during and/or after film formation by virtue of forming disulphide links on air oxidation (this could be speeded up by using a mild oxidising catalyst).

Siloxane and epoxide groups are other types of groups which can be employed for crosslinking purposes.

Where Y is a non-ionic dispersing group, the polymer has increased utility in aqueous-based compositions (particularly coating compositions) by virtue of having enhanced stability.

Where Y is a terminally-disposed polymeric chain group, such as a polyester chain, this will yield novel polymer/polyester (or other polymer type) block copolymers.

It is of course possible for a final polymer according to the invention to possess groups Y which are of 2 or more different types, rather than being all of the same type.

A polymer according to the invention will usually contain 0.1 to 1000 millimole of groups Y per 100 g of polymer, more usually 5 to 100 millimole per 100 g of polymer, although the particular proportion of Y groups will naturally be selected with their nature and the intended application of the polymer in mind.

Where a composition comprising a polymer according to the invention incorporates a coreactant (e.g. for crosslinking), the level of such a material is often that to provide a range of 0.25 of to 4.0 moles of the relevant functional groups of the coreactant per mole of Y groups present in the polymer, more usually 0.5 to 2.0 moles per mole (especially 0.5 to 1.5 moles per mole).

As discussed supra, the polymers of the invention are particularly useful as components of coating compositions (e.g. protective or adhesive coating compositions), and especially aqueous-based coating compositions. Such compositions may e.g. provide film coatings (using an appropriate polymer type) of improved properties such as film hardness, solvent resistance, corrosion resistance, or decreased water permeability.

Such coating compositions may be applied to a variety of substrates including wood, metals, glass, cloth, leather, paper, plastics, foam and the like, by any conventional method including brushing, dipping, flow coating, spraying, and the like. The compositions may contain other conventional ingredients including organic solvents (e.g. coalescing solvents), pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently as appropriate or desired. It is possible to include an amount of antimony oxide in the dispersions to enhance the fire retardant properties.

Such compositions could, if desired and if appropriate, include other polymer dispersions (i.e. polymers other than polymers bearing Y groups), for example polyvinyl acetate, polyethylene, polystyrene, polybutadiene, polyvinyl chloride, polyacrylate, polyurethanes, polyesters, polyimides, polyepoxides, and other homopolymer and copolymer dispersions. These can sometimes be prepared in-situ (e.g. by polymerisation of the monomers in the presence of the polymer according to the invention).

The present invention is now illustrated by the following examples. Unless otherwise specified, all parts and percentages are on a weight basis.

In these examples, the double rub test assesses the solvent resistance of a film and is effected by rubbing the film with a rag soaked with a solvent (e.g. methyl ethyl ketone MEK) until the film fails (i.e. is showing through) or until 200 double rubs is achieved before failure, when the film is rated as follows:

200 (0/5): film failed
200 (1/5): film is severely affected
200 (2/5): film is affected
200 (3/5): film is slightly affected
200 (4/5): film is hardly affected
200 (5/5): film is unaffected

EXAMPLE 1

4.5 g Irgacure 651 (a photoinitiator ex Ciba Geigy, structure $C_6H_5COC(OCH_3)_2C_6H_5$) was dissolved in 30 g 2-(acetoacetoxy) ethyl methacrylate (AAEM). To 150 g of an imminated (using propylene imine) acrylic aqueous latex (containing a theoretical maximum of about 2.5 millimoles of lateral —$NH_2$ and —NH— groups per 100 g of polymer although we believe in practice only about 50% of theoretical immination of carboxyl groups may have occurred) was added slowly with stirring 10.5 g of the above AAEM/Irgacure 651 solution to give a formulation containing 1.8% w/w Irgacure 651 on total polymer solids and an acrylic polymer having lateral methacryloyl groups incorporated by reaction of the enolic carbonyl groups of the AAEM with the —$NH_2$ and —NH— groups on the imminated latex (13.5% w/w AAEM on latex solids, 1 equivalent on propylene imine, being used—corresponding to a theoretical maximum of about 62.5 millimoles of polymer-bound methacroylyl groups per 100 g polymer).

EXAMPLE 2

9 g Irgacure 651 was dissolved in 30 g AAEM. 7 g butoxyethanol (cosolvent) was added slowly with stirring to 150 g of an imminated acrylic latex (as used in Example 1). To 122 g of this butoxyethanol-containing latex was added slowly with stirring 4.8 g of the above AAEM/Irgacure 651 solution to give a formulation containing 1.9% w/w Irgacure 651 on total polymer solids and an acrylic polymer having lateral methacryloyl groups (6.7% w/w AAEM on latex solids, 0.5 equivalents on propylene imine, being used—corresponding to a theoretical maximum of about 31.25 millimoles of polymer-bound methacryloyl groups per 100 g polymer).

The performance of the above-described methacroylyl-functional polymers was tested as follows. 100μ (wet film thickness) films were cast from the formulated latices described in the above examples onto glass plates. After allowing to dry, the films were photocured using a medium-pressure Hg arc lamp with an exposure of approximately 500 mJ.cm$^{-2}$.

The solvent resistance of the films before and after curing was assessed using the MEK double rub method. A control film (from the imminated acrylic latex having had no AAEM added thereto) was also tested for comparison purposes. The results were as shown in the following table.

| Polymer used | No MEK double rubs | |
| --- | --- | --- |
|  | uncured | cured |
| ex Ex 1 | ca 100 | 200 (4/5) |
| ex Ex 2 | ca 100 | 200 (3/5) |
| Control | ca 100 | ca 100 |

We claim:

1. Process for the production of a polymer having desired groups, denoted by Y, incorporated therein, which process comprises reacting a precursor polymer having carbon-bound or nitrogen-bound precursor groups selected from the class consisting of —NH$_2$ and —NH— groups, which groups are reactable with enolic carbonyl groups, with at least one compound having a single enolic carbonyl group and at least one group Y, so that the final polymer resulting from said process is said polymer having said groups, Y, and wherein the basic structure of said polymer having said groups Y is that of, an olefinic addition polymer formed by free radical addition polymerisation, and wherein by an enolic carbonyl group is meant a carbonyl group having enolic character by virtue of being bonded to alpha methylene or methine group which is itself bonded alpha to an electron withdrawing group, said electron withdrawing group being provided by an acid ester group, an acid amide group, an aryl group or a ketonic carbonyl group, and wherein further Y is selected from the group consisting of an olefinically unsaturated double bond, a thiol group, a siloxane group, and an epoxy group.

2. Process according to claim 1 wherein said olefinic addition polymer is made by forming an olefinic addition polymer bearing chain-pendant carboxyl groups (preprecursor polymer), converting at least a proportion of the chain-pendant carboxyl groups of the preprecursor polymer to groups providing chain-pendant precursor amino groups (the polymer then being a precursor polymer), and reacting said precursor amino groups with said enolic compound.

3. Process according to claim 2 wherein the conversion of carboxyl to amino groups is effected by an imination reaction.

4. A process as claimed in claim 1 wherein said precursor polymer has the basic structure of an olefinic addition polymer made by a free radical addition polymerisation process and is prepared from an olefinic addition polymer bearing chain-pendant carboxyl groups by converting at least a proportion of the chain-pendant carboxyl groups thereof to groups providing chain-pendant precursor amino groups using an imination reaction and wherein said group Y is an olefinically unsaturated double bond provided by a methacryloyl group.

5. A process according to claim 1 wherein the groups Y are disposed as chain-pendant or terminal groups in the polymer.

6. A process as claimed in claim 5 wherein said precursor polymer has the basic structure of an olefinic addition polymer made by a free radical addition polymerisation process and Y is an olefinically unsaturated double bond.

7. A process as claimed in claims 6 wherein said compound is 2-(acetoacetoxy) ethyl methacrylate.

8. Process according to claim 1 or 5 wherein the enolic carbonyl group is provided as part of a larger grouping selected from those of formulae

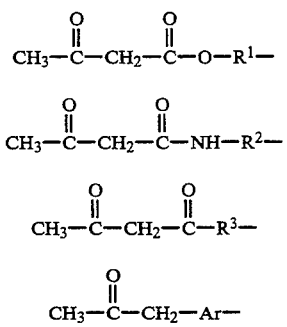

where R$^1$, R$^2$, or R$^3$ are optionally substituted hydrocarbyl radicles, and Ar is an optionally substituted arylene group.

9. Process according to claim 1 or 5 wherein Y is an olefinically unsaturated double bond provided by a group selected from acryloyl, methacryloyl, allyl, and methallyl, or a substituted derivative thereof.

10. Process are to claim 1 or 5 wherein Y is a siloxane group of formula:

wherein i is 0,1, or 2 and k is 1,2, or 3 provided that k plus is equals 3, and R$^4$ and R$^5$, which may be the same or different, are hydrocarbyl groups.

11. Process according to claim 1 or claim 5 wherein said precursor polymer used in the process is an imminated acrylic polymer.

12. Process according to claim 1 or claim 5 wherein the resulting polymer contains 0.1 to 1000 millimole of groups Y per 100 g of polymer.

13. Process according claim 1 or claim 5 wherein the polymer having desired group Y is produced from the process in the form of, or subsequently converted to, an aqueous or organic-based dispersion of the polymer.

14. A polymer having desired groups, denoted by Y, incorporated therein, wherein said polymer has been prepared by process comprising reacting a precursor polymer having carbon-bound or nitrogen-bound precursor groups selected from the class consisting of —NH$_2$ and —NH— groups, which are reactable with enolic carbonyl groups, with at least one compound having a single enolic carbonyl group and at least one group Y, so that the final polymer resulting from said process is said polymer having said groups Y, and wherein the basic structure of said polymer having said groups Y is that of an olefinic addition polymer formed by free radical addition polymerisation, and wherein by an enolic carbonyl group is meant a carbonyl group having enolic character by virtue of being bonded to an alpha methylene or methine which is itself bonded alpha to an electron withdrawing group, said electron withdrawing group being provided by an acid ester group, an acid amide group, an aryl group or a ketonic carbonyl group, and wherein further Y is selected from the group consisting of an olefinically unsaturated double bond, a thiol group, a siloxane group, and an epoxy group.

15. An aqueous or organic-based dispersion of a polymer according to claim 14.

16. An aqueous —or organic-based composition comprising a polymer according to claim 14.

17. Composition according to claim 16 which is an aqueous-based composition and comprises an aqueous dispersion of said polymer.

18. Composition according to either claim 16 or claim 17 wherein said composition is a coating composition.

19. Composition according to claim 18 wherein said Y groups take part in a crosslinking reaction during and/or after film formation from the composition.

20. Composition according to claim 19 wherein said composition includes a coreactant material, reactable with to the groups Y in the polymer, which takes part in or assists the crosslinking reaction during and/or after film formation.

21. Composition according to claim 20 wherein said coreactant material is an oxidising catalyst, a photoinitiator, a peroxy curing agent or a metal drier salt.

22. A film coating derived from a composition according to claim 18.

* * * * *